April 18, 1939.  E. C. RYAN  2,155,242

TROLLEY HEAD

Filed Feb. 8, 1938   2 Sheets-Sheet 1

Inventor
EDMUND C. RYAN
By
Attorney

April 18, 1939.  E. C. RYAN  2,155,242

TROLLEY HEAD

Filed Feb. 8, 1938  2 Sheets—Sheet 2

Inventor
EDMUND C. RYAN

By

Attorney

Patented Apr. 18, 1939

2,155,242

UNITED STATES PATENT OFFICE 2,155,242

TROLLEY HEAD

Edmund C. Ryan, Mansfield, Ohio, assignor to The Ohio Brass Company, Mansfield, Ohio, a corporation of New Jersey Application February 8, 1938, Serial No. 189,336

9 Claims. (Cl. 191—59.1)

My invention relates to current collectors for use on vehicles and intended to contact with overhead conductors whereby current may be taken from the conductors while the vehicles are standing or moving, and has particular application to vehicles of the bus type or may be used with vehicles of the track type sometimes referred to as street cars.

In the bus type of vehicle the collector must be capable of pivoting in at least two different directions, as for instance, in a vertical plane and in a plane at right angles thereto, and means for securing such movements is one of the objects of my invention.

Another object of my invention is to provide means to protect the shoe from damage in case of dewirement of the trolley head.

Another object is to provide a shoe which is simple in construction and relatively inexpensive.

Still another object of my invention is to provide a head in which the shoe is easily and quickly renewed or replaced when so desired.

I attain these objects and others hereinafter disclosed by the new and novel construction, combination and relation of the parts described in this specification following, illustrated in the accompanying drawings, and more particularly set forth in the appended claims.

In the drawings—

Figure 6:
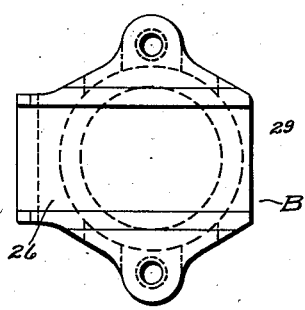
Figure 8:
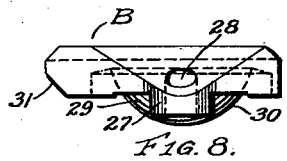
Figure 7:
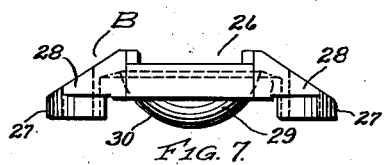

Figs. 6, 7, and 8 are top, end, and side views respectively of the top saddle member.

Figure 9:
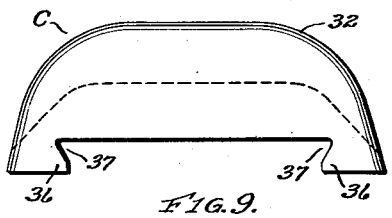

Fig. 9 is a side view of the current collecting shoe.

Figure 10:
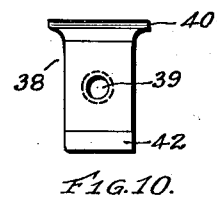

Fig. 10 is a face view of the clamping member for holding the shoe in position.

Figure 4:
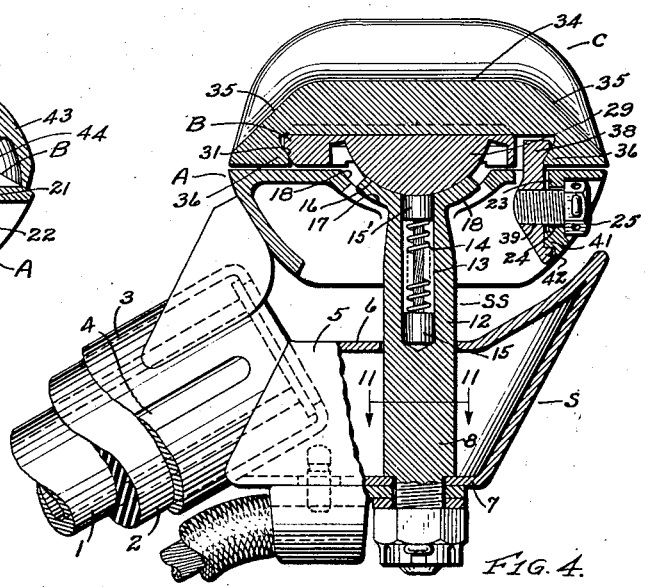
Fig. 4 is a partial section taken in a longitudinal plane with respect to Fig. 1 and conforming to the vertical axis X—X of Fig. 2.
Figure 5:
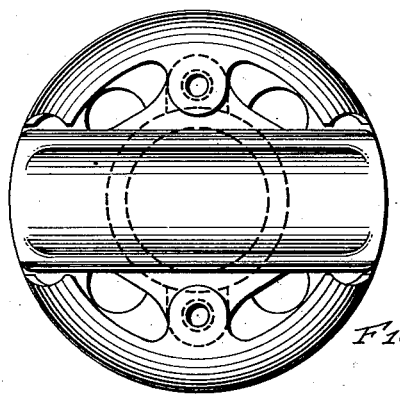
Fig. 5 is a top view of the lower saddle and the upper saddle portion and shoe, shown in Fig. 1.
Figure 11:

Fig. 11 is a section taken on the line 11—11 of the support member shown in Fig. 4.

Figure 12:
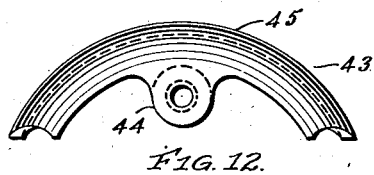

Fig. 12 is a top view of a guard member.

Figure 13:
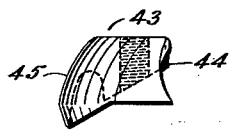

Fig. 13 is an end view of Fig. 12.

In the preferred embodiment of my invention, I employ a support member 1 which may be the end of a trolley pole mounted on the vehicle or it may be a short length of tube or rod for attachment to the end of the trolley pole, and made preferably of steel.

The member 2 is a sleeve of insulating material preferably deformable or resilient rubber mounted upon the end of the member 1 and secured thereto against accidental removal.

Mounted upon the sleeve 2 is a support member S formed from parts of sheet metal and the parts welded together, or the entire member S may be made of a casting, preferably malleable cast iron.

The support S is provided with an elongated tubular portion 3 arranged to be mounted upon the member 2 and secured against accidental or unintentional removal, and is prevented from rotating relative to the member 2 by the side wall depression 4 or other approved means which forms an interlock with the member 2.

Projecting from the portion 3 is a portion 5 provided with a top wall 6 and a bottom wall 7, and having registering openings, at least one opening conforming to the shape shown in Fig. 11 or other non-circular shape to receive the support stud SS.

The shape of the portion 8 of the stud SS is such that the stud is prevented from rotating relative to the support S and is held in fixed relation thereto by means of the shoulder 9 and the nut 10 on the threaded end 11.

The portion 12 of the stud SS is preferably circular in cross-section and provided with an axial orifice 13 in which a spring expanded conductor 14 is mounted and provided with end contacts 15 and 15' made preferably of copper and connected by a copper conductor.

A flange is provided at the upper end of the portion 12 of the support SS and the upper surface 16 is concave and the outer surface 17 is convex and parallels the surface 16.

Mounted upon the support SS is a saddle comprising a lower saddle member A and an upper saddle member B. Both members are made of metal, preferably ferrous, although either may be made of a non-ferrous metal.

Mounted upon the top saddle member B is a current collecting shoe C.

The member A and its walls are made as light as possible. The upper surface of the member A has a cup-shaped depression formed with a concave spherical surface 18 which conforms to the convex spherical surface 17. Opening into the spherical cavity 18 from below is an elongated slot 19 (Fig. 3) through which the support SS extends.

Projecting downwardly and extending along the slot 19 are spaced side walls 20 which contact with the portion 12 of the support SS sufficiently to maintain the shoe and saddles in an upright position relative to the axis X—X.

Openings 21 extend through the upper wall of the member A to receive the bolts 22.

Figure 1:
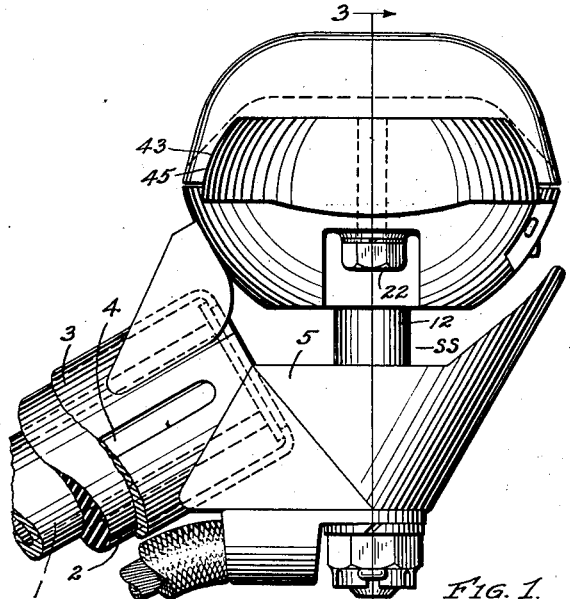
Fig. 1 is a side elevation of my invention.
Figure 2:
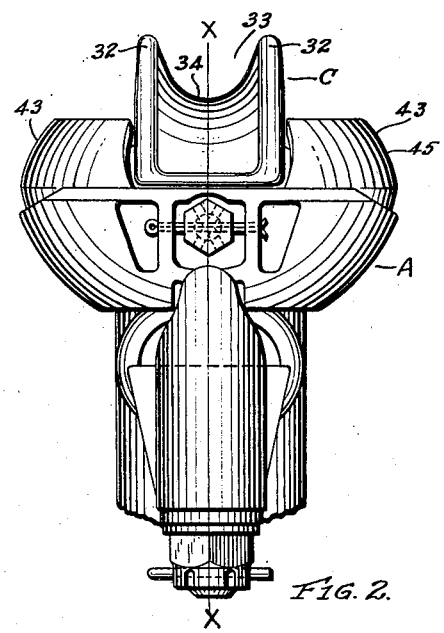
Fig. 2 is a front end view in elevation thereof.

The elongated slot 19 permits the saddle parts A and B to pivot relative to the shoe C in a plane common to the axis X—X of Fig. 2 and the longitudinal axis of the groove in the shoe. While the axis X—X does not alway coincide to a vertical plane in all directions when the device is in operation, it may be said to be vertical for all intents and purposes as it is substantially so at most times.

The member A is provided with a wall 23 (Fig. 4) and an opening 24 through which projects a bolt 25.

Mounted upon the saddle member A is the saddle member B which has a longitudinal slot 26 in its face in which is positioned the shoe C. Projecting downwardly are two lugs 27 and each provided with a through opening 28 through which projects the bolts 22.

The member B is provided on its under surface with a projecting portion 29 having a convex spherical surface 30 corresponding to the concave spherical surface 16 of the support SS.

The contact 15' with the conductor 14 engages with the spherical surface 30 on the projecting portion 29.

The upper saddle member B is provided with an under cut surface 31 at one end thereof and which is located above the upper surface of the member A and forms therewith a transverse V-shaped groove.

The collector shoe C comprises a body of metal, preferably copper, bronze or other non-ferrous metal, although many such shoes are made of ferrous metals of various compositions and hardness, and is provided with spaced flanges 32 forming the wire receiving groove 33 therebetween with the longitudinal surface 34 arranged to engage the overhead conductor or trolley wire. The ends 35 of the contact surface 34 are sloped downwardly and outwardly.

The shoe C is provided adjacent each end with an inwardly projecting lug 36 extending transversely of the shoe and forming with the shoe a transverse groove 37, either groove arranged to be received by and interlocked with the transverse V-shaped groove formed by the saddles A and B when the shoe is mounted in the longitudinally extending slot 26.

When the shoe is thus mounted one end will be securely held in position and in order to hold the other end of the shoe in position, I provide a clamp 38 (Figs. 4 and 10) which is threaded at 39 to receive the bolt 25 and has a projecting portion 40 (Fig. 10) which projects through an opening in the upper wall of the saddle A and interlocks with the transverse lug or hook at the other end of the shoe to hold it in secure position.

The saddle member B is provided with an inwardly projecting flange 41 which is engaged by a flange 42 on the clamp 38 which prevents the clamp moving upwardly when the bolt 25 is tightened.

The bevelled surfaces at the ends of the shoe coact with those on the saddle B and the clamp 38 thus drawing the lower face of the shoe into close engagement with the surface of the groove 26 in the saddle member B, thus giving and maintaining efficient electrical contact between these parts.

In order to change or replace the shoe C it is only necessary to loosen the bolt 25 sufficiently for the clamp 38 to disengage the projection 36 on the shoe.

Figure 3:
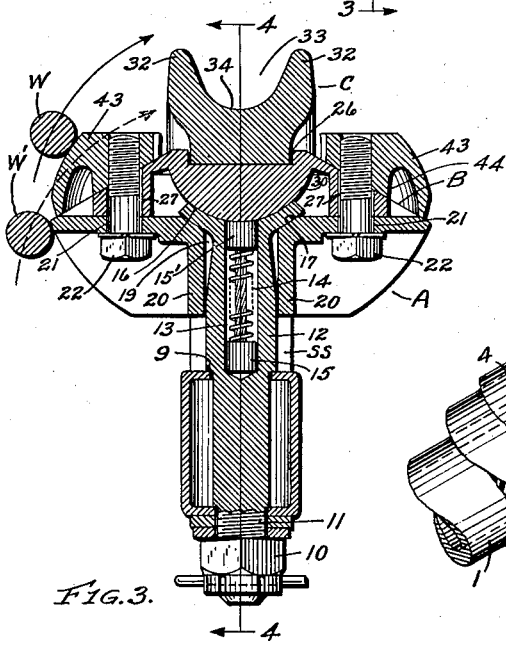
Fig. 3 is a section on the line 3—3 of Fig. 1.

In order to prevent the shoe C from being damaged as is often the case through heavy side contact with the trolley wire as when the trolley head becomes accidentally disengaged from the trolley wire, I provide detachable arcuate guard members 43 positioned on opposite sides of the shoe along its longitudinal faces whereby when a trolley wire W contacts along the side of the trolley head it is maintained out of contact with the shoe to a point x which is well up the side of the shoe and spaced therefrom after which the movement of the wire relative to the head is very likely to follow the arrow shown in full line, thus avoiding contact with the shoe. The guard 43 is made as high as possible without interfering with the devices forming a part of the overhead construction and as shown in Figs. 2—3 the periphery x of the upper outer edge is located well above the base of the shoe and spaced from the shoe.

Without the guard 43 the trolley wire W' in case of dewirement of the head is very likely to follow the arrow shown by dotted lines.

The guard is shown more in detail in Figs. 12 and 13, and comprises a member forming an arc of a circle, the maximum diameter of which is that of the saddle member A. The guard is also provided with a boss 44 which is threaded to receive the bolts 22 whereby the guard is detachably held in position. The lower face of the guard is made to correspond with the adjacent portions of the saddle members A and B, and the outer side face 45 of the guard is preferably rounded transversely thereof and along which the trolley wire may slide.

It will be apparent to those skilled in the art that the guard 43 may be made an integral part of the saddle portion A in which case the boss or lug 44 would be eliminated and the lugs 27 on saddle B would be threaded for bolts 22 and the guard would constitute substantially an arcuate flange extending upwardly with the side walls curved transversely as at 45 in Fig. 13. The guard adds materially to the appearance of the head.

My invention constitutes an improvement over that shown in U. S. Patent 1,893,383, granted C. J. Way, January 3, 1933, and U. S. Patent 2,044,886, granted June 23, 1936, to E. A. Larsson; I therefore do not claim such combinations broadly, but

I claim:

1. A current collector head comprising a support for attachment to a trolley pole and provided with a cup shaped receptacle having a concave spherical bearing surface, swivel means mounted on the support and provided with a projecting boss having a convex spherical bearing surface contacting the first bearing surface to support the said means to swivel relative to the support, a shoe mounted on the swivel means to engage a trolley conductor, holding means on one end of the shoe to interlock with means on the swivel means to hold said end in position, like holding means on the other end of the shoe, a clamp to lock with the swivel means and having means to interlock with the last said holding means on the shoe to hold the second said end of the shoe in position and means engaging the said clamp and the swivel means whereby the clamp may be drawn into close clamping relation with the said shoe and swivel means and effecting a closer contact between the shoe and the swivel means.

2. A current collector head comprising a support for attachment to a trolley pole, means mounted on the support to swivel relative to the support in a vertical plane and in another plane angularly disposed to the vertical plane, an elongated current collector shoe mounted on the swivel means and having at each end a transverse groove, each facing the other, means on the swivel means to interlock with the groove at one end of the shoe to hold that end in position on the swivel means, a clamping member adjustably attached to the swivel means and having a projection thereon to enter the groove at the other end of the shoe to hold it in position and means to adjust the clamp relative to the swivel means and to the shoe to increase the grip on the shoe and the contact of the shoe to the swivel means.

3. A current collector head comprising a support for attachment to a trolley pole, means supported by the said support to swivel in a plurality of different planes relative to the support, a current collector shoe mounted on the swivel means to engage with a trolley wire and provided with a transverse hook at each end, a transverse groove on the swivel member to receive the hook at one end of the shoe and hold that end of the shoe in place, a clamping member provided with a hook to interlock with the hook at the other end of the shoe to hold that end of the shoe in place, means to draw the clamping member into tighter relation with the shoe and the shoe into closer relation with the swivel means and means to interlock the clamping member with the swivel member to prevent movement of the clamping member relative to the swivel member other than that to increase the grip of the clamping member on the shoe.

4. A current collector head comprising a support provided with means to secure it to a trolley pole, a current collector shoe mounted on the support, a transverse hook at each end of the shoe, each hook having a sloping bearing face and forming a groove with the shoe body, a transverse hook on the support with a sloping bearing face, the said bearing faces cooperating to hold the shoe end and the support in engagement and capable of increasing the engagement, a clamping member associated with the support and having a hook with a sloping bearing face to cooperate with the bearing face at the other end of the shoe and rotatable means to move the clamping member into tighter relation with the shoe and the shoe into tighter relation with the support.

5. A current collector head comprising a support for attachment to a trolley pole, a supplementary support mounted on the first said support to pivot in a plurality of planes relative to the first said support, the supplementary support having a transverse wall and a bearing surface engaging a bearing surface on the first said support whereby said pivotal movement is effected, a shoe mounted on the supplementary support and having one end thereof interlocked with means on the supplementary support to hold the said end of the shoe in place, an opening through the transverse wall, a clamping member associated with the supplementary support and projecting through said opening from below and having means to interlock with means on the other end of the shoe to hold it in place and means associated with the supplementary support to move the clamping member relative to the shoe to effect said interlock between the shoe and clamping member and draw the shoe into contact with the supplementary support.

6. A current collector head comprising a primary support provided with means to secure it to a trolley pole, an auxiliary support pivotally mounted on the primary support and provided with a transverse wall and a bearing surface engaging a bearing surface on the primary support whereby said pivotal movement is effected, a shoe mounted on the auxiliary support to engage with a trolley wire and having one end interlocked with means on the auxiliary support to hold the said end in place, an opening through the transverse wall, a detachable clamping member associated with the auxiliary support and projecting through said opening from below and having means to interlock with means on the other end of the shoe to hold it in place and having other means to cooperate with the auxiliary support to hold the clamping member against movement towards the shoe, means associated with the auxiliary support to draw the clamp into closer relation with the shoe and the shoe into closer relation with the auxiliary support and upwardly projecting flanges or rims from the auxiliary support, one on each side of the shoe to be engaged by the trolley wire in case of dewirement of the head and to divert the wire from contact with the shoe.

7. A current collector head comprising a support arranged to be mounted on a trolley pole, a current collector shoe mounted on the support to engage a trolley wire, hook shaped means at each end of the shoe, hook shaped means on the support and adapted to interlock with the hook shaped means on the shoe to hold the shoe in position on the support, one said means on the support being movable relative to the shoe and to the support whereby the shoe may be released from the support, means associated with the support and the said movable means whereby the said movable means may be moved into close clamping relation with the shoe or may be released therefrom and upstanding means on opposite sides of the shoe to engage with the trolley in case of dewirement of the head and to divert the wire from engagement with the shoe.

8. An attachment for a trolley head comprising a support adapted to be mounted on a trolley pole, a grooved shoe mounted on the support to receive a trolley wire within the groove and to slide along the wire, the shoe having one end provided with means to interlock with means on the support to hold the said end of the shoe in place, a transverse groove at the other end of the shoe, a clamping member movably associated with the support and having means to enter the transverse groove and interlock with the end of the shoe, and means associated with the support and clamping means to draw the clamping member into clamping relation with the shoe and support to hold the shoe in position.

9. An attachment for a trolley head comprising a support adapted to be mounted on a trolley pole, a grooved shoe mounted on the support to receive a trolley wire within the groove and to slide along the wire, the shoe having one end provided with means to interlock with means on the support to hold the said end of the shoe in place, a transverse groove at the other end of the shoe, a clamping member movably associated with the support and having means to enter the transverse groove and interlock with the end of the shoe, and means associated with the support and clamping means to draw the clamping member into clamping relation with the shoe and support to hold the shoe in position and upwardly projecting means on opposite sides of the shoe to engage with the trolley wire in case of dewirement of the shoe and to divert the wire from engagement with the shoe.

EDMUND C. RYAN.